United States Patent
Dietterle et al.

Patent Number: 5,360,463
Date of Patent: Nov. 1, 1994

[54] AIR FILTER ASSEMBLY FOR HEATING OR AIR-CONDITIONING SYSTEM

[75] Inventors: Thomas Dietterle, Simmozheim; Markus Schöllhorn, Sindelfingen, both of Germany

[73] Assignee: Mercedes-Benz AG, Stuttgart, Germany

[21] Appl. No.: 23,685

[22] Filed: Feb. 26, 1993

[30] Foreign Application Priority Data

Feb. 26, 1992 [DE] Germany ............... 4205836

[51] Int. Cl.$^5$ ................................ B60H 3/06
[52] U.S. Cl. ........................ 55/422; 55/506; 55/507; 55/511; 55/DIG. 5; 454/158; 403/381
[58] Field of Search ............ 55/495, 507, 509, 503, 55/506, 482, 493, 497, 501, 504, 513, DIG. 31, 495, DIG. 5, 422, 511; 454/158; 403/381, 340

[56] References Cited

U.S. PATENT DOCUMENTS

| | | | |
|---|---|---|---|
| 1,540,788 | 6/1925 | McClure | 55/495 |
| 3,591,212 | 7/1971 | Rhyne | 403/381 |
| 3,755,995 | 9/1973 | Stickel | 55/DIG. 31 |
| 4,173,287 | 11/1979 | Kumakawa | 403/381 |
| 4,519,823 | 5/1985 | Kinney, Jr. et al. | 55/509 |
| 4,564,732 | 1/1986 | Lancaster et al. | 403/381 |
| 4,737,174 | 4/1988 | Pontius | 55/493 |
| 4,801,316 | 1/1989 | Schroeder | 55/504 |
| 5,042,615 | 8/1991 | Anderson | 403/381 |
| 5,062,353 | 11/1991 | Arold et al. | 454/158 |
| 5,114,265 | 5/1992 | Grisley | 403/381 |
| 5,203,639 | 4/1993 | Fimrite | 403/340 |

FOREIGN PATENT DOCUMENTS 0380026  1/1990  European Pat. Off. .
4004501  8/1991  Germany .

*Primary Examiner*—Robert J. Warden
*Assistant Examiner*—Hien Tran
*Attorney, Agent, or Firm*—Evenson, McKeown, Edwards & Lenahan

[57] ABSTRACT

A heating or air-conditioning system for the interior of a motor vehicle, is provided which has an exchangeable air filter comprising two mutually adjoining filter sections, surrounded peripherally by a holding frame. For the insertion of the filter, the first filter section is initially fed in through an assigned opening and is then displaced sidewards into its working position and the second filter section is only then inserted. Two identical filter sections are used to increase the sealing effect, the mutually adjoining longitudinal sides of which, upon the second filter section being fed in, are connected by means of a tongue-and-groove joint, extending along the top of said longitudinal sides or alternately over half their length, into a mutually adjacent position. Guide devices ensure that the filter sections slide onto the holding frame.

10 Claims, 2 Drawing Sheets

AIR FILTER ASSEMBLY FOR HEATING OR AIR-CONDITIONING SYSTEM

BACKGROUND AND SUMMARY OF THE INVENTION

The invention relates to a heating or air conditioning system for the interior of a motor vehicle, of the type having an exchangeable air filter comprising two mutually adjoining filter sections, surrounded peripherally by a holding frame. For the insertion of the filter, the first filter section is initially fed in through an assigned opening and is then displaced sidewards into its working position and the second filter section is only then inserted into the cleared receiving chamber.

A filter which can be inserted in this way and which can be removed again in the reverse order for exchange purposes is described in German Patent Document DE 40 04 501 C2 corresponding to U.S. Pat. No. 5,062,353. In this arrangement the filter admission opening is disposed on the back of a glove box. Due to the lack of accessibility, however, a check cannot be made to ensure that the filter sections, in the course of their insertion procedure, reach the pre-determined working position, so that a reduction in the efficiency of the filter as a result of leaks cannot be completely ruled out.

An object of the invention is to provide a filter-receiving system in which the filter sections, during their insertion, are guaranteed to be transferred into their pre-determined working position, which position prevents any leakage-air from passing through.

This object is achieved according to preferred embodiments of the invention by providing an air filter assembly comprising:

a filter holding frame having a filter exchange opening and filter section guide devices for guiding insertion movement of filter sections in to respective in-use positions in the holding frame, and first and second filter sections configured to be inserted into the holding frame with the first filter section inserted into the exchange opening and then laterally displaced to its in-use position followed by the second filter section being inserted into the exchange opening with mutual overlapping interengagement of facing lateral edges of the first and second filter sections to thereby reliably hold the first and second filter sections together in their respective in-use positions.

In the course of being fitted, the first filter section is transferred during the laterally directed displacement movement into a working position which no longer is changed uncontrolledly upon the insertion of the second filter section. Because the holding frame in preferred embodiments is provided with at least two holding-down devices which resiliently engage over the narrow sides of the first filter section and exhibit, in the transverse-displacement direction of the first filter section, a bulged profile in the direction of the latter. Thus the insertion movement of the filter sections is reliably controlled in a simple matter.

In a further aspect of preferred embodiments of the invention, the holding frame is equipped, on its side assigned to the rear, narrow side of the second filter section in the feed-in direction of the latter, with a holding-down device resiliently engaging over the narrow side, which holding down device exhibits, in addition to butt slopes for the narrow side sliding therebelow, a bulged profile in the direction of the latter, so that, one after the other, both filter sections easily reach the position envisaged for them in interaction with the guide devices in the area of their assigned narrow sides.

When the holding frame is provided on the feed-in the filter sections with a hinged holding-down device which, when swivelled upwards, resiliently engages over the assigned narrow side of the inserted second filter section and simultaneously locks onto the edge of the holding frame in a detachable fashion, then, on the one hand, the filters can be easily exchanged and, on the other hand, the inserted second filter section can be easily fixed in place on the feed-in side.

Other objects, advantages and novel features of the present invention will become apparent from the following detailed description of the invention when considered in conjunction with the accompanying drawings.

DETAILED DESCRIPTION OF THE DRAWINGS

Figure 1:
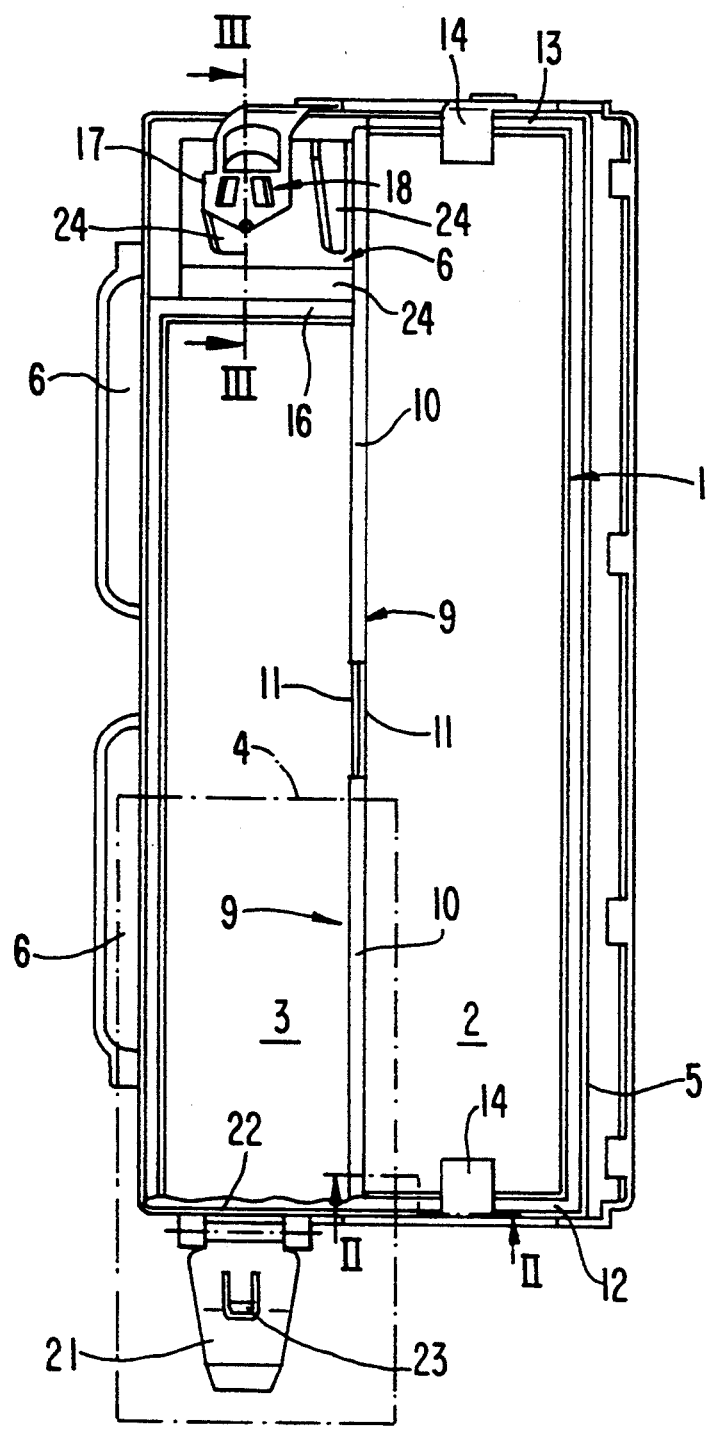
FIG. 1 shows a top view and a filter system showing two filter sections received by a frame, the second filter section not yet having quite reached its working position, constructed according to a preferred embodiment of the invention.

An air filter 1, which is disposed in sunken arrangement (in a manner not represented in greater detail) on the air-inlet side in front of a windshield, comprises two identical filter sections 2 and 3, which exhibit a circumferential seal on their underside and which can be lowered (in a manner further described later) through an opening 4, indicated in dash-dotted lines, in the direction of a holding frame 5. Downwardly protruding wall parts 6 of blowers (not shown) are formed on the holding frame 5.

Figure 2:
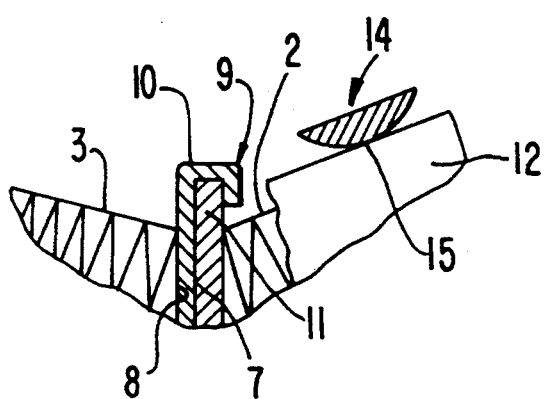
FIG. 2 shows the section along the line II—II in FIG. 1.
Figure 4:
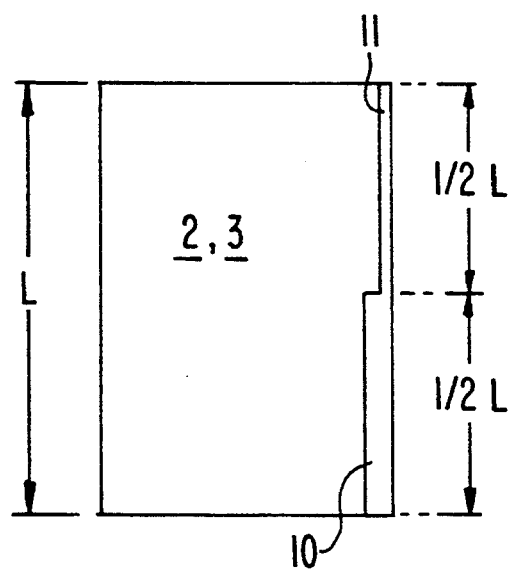
FIG. 4 is a schematic plan view of a filter section, showing the extent of the groove and tongue configuration along the longitudinal edges thereof.

As can be seen in particular from FIG. 2, the two inner longitudinal sides 7 and 8 of the two filter sections 2 and 3 lie adjacent to each other and are covered on the top by tongue-and-groove joints 9 which are inverted over half the extent of the said filter sections. FIG. 4 schematically depicts this extension of each of the groove 10 and the tongue 11 over one half of the length ($\frac{1}{2}$ L) of the filter sections 2 and 3. In this case, allocation is arranged such that, on the first filter section 2, the half of the longitudinal side 7 which is remote from the feed-in side ends on the top in a downwardly open groove 10 and the half of the longitudinal side 7 close to the feed-in side ends in the upward direction in a tongue 11. In the case of the second filter section 3, the groove 10 and the tongue 11 are disposed in the reverse order, since one of the two identical filter sections 2 and 3 is installed turned through 180°.

Figure 3:
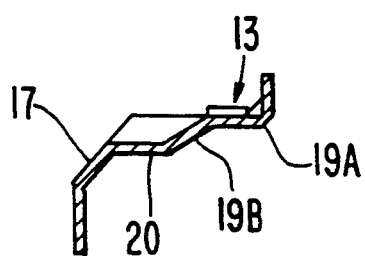
FIG. 3 shows the section along the line III—III in FIG. 1.

The first filter section 2 exhibits two narrow sides 12 and 13 which resiliently engage over holding devices 14 fastened to the holding frame 5, which holding-down devices exhibit a bulged profile 15 in the direction of the narrow sides 12 and 13, as shown in FIG. 2 in relation to the narrow side 12. To the rear, narrow side 16 of the second filter section 3 there is assigned a further holding-down device 17, which bears on its top a receiving device 18 for a temperature sensor (not represented) and on its bottom—as shown in particular by FIG. 3—butt slopes 19A and B, the rear butt slope 19B merging into a section having a bulged profile 20.

On the side of the holding frame 5 lying opposite the holding-down device 17 there is secured a hinged holding-down device 21, which, when it is swung up, resiliently engages over the narrow side (not represented) of the fully fed-in second filter section 3 and simultaneously detachably locks by means of a latch boss 23 onto the edge 22 of the holding frame 5, so that, even if the filter 1 has not been inserted, the holding down device 21 cannot protrude down freely during fitting of the heating or air-conditioning system.

In order to fit the filter 1, first of all the first filter section 2 is introduced through the indicated opening 4, the longitudinal side 7 of the filter section 2 pointing towards the left and, consequently, the downwardly open groove 10 lying at the front in the feed-in direction. In this feed-in procedure, any tilt towards the right in the holding frame 5 is prevented by the fact that the facing wall parts 6 act as guides and guide devices 24 protruding down from the holding frame 5 are additionally provided, on which the filter section 2 only slides along in order then, under resilient action by the holding-down device 17, to slide onto the holding frame 5. The first filter section 2 is then displaced on the holding frame 5 towards the right and into the position shown in FIG. 1, the two holding down device 14, due to the bulged profile 15 on their underside, not hindering the displacement procedure. The second filter section 3 is then lowered, turned through 180° in relation to the first filter section 2, into the opening 4; the tongue 11 of the second filter section 3, which tongue now lies at the front in the feed-in direction, travelling under the assigned groove 10 of the first filter section 2, whilst the groove 10 of the second filter section 3 travels over the tongue 11 of the first filter section 2, so that, when the second filter section 3 is fully fed-in, both filter sections 2 and 3 are hooked together to form a seal. In order, on the inlet side also, to prevent the second filter section 3 from escaping upwards, the holding-down device 21 is swivelled upwards, whereby the latter resiliently engages over the filter section 3 and is simultaneously locked in a detachable fashion by means of a latch boss 23 onto the edge 22 of the holding frame 5.

In order to exchange the filter 1, after the holding-down device 21 has been swung down, the procedure is conducted in the reverse order.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An air filter assembly for a heating or air-conditioning system for the interior of a motor vehicle, comprising:

a filter holding frame having a filter exchange opening and filter section guide devices for guiding insertion movement of filter sections into respective in-use positions in the holding frame, and first and second filter sections configured to be inserted into the holding frame with the first filter section inserted longitudinally into the exchange opening and then laterally displaced to an in-use position followed by the second filter section being inserted longitudinally into the exchange opening with mutual overlapping interengagement of facing lateral edges of the first and second filter sections to thereby reliably hold the first and second filter sections together against relative lateral movement in respective in-use positions, wherein the first and second filter sections have identical lateral edges which are overlappingly interengaged when the filter sections are in in-use positions at the filter holding frame, wherein said identical lateral edges each include a tongue section over a predetermined portion thereof and a groove section over a remaining portion thereof, each of said portions extending along only a part of the length of the respective lateral edges, and wherein the tongue section of the first filter section is overlappingly interengaged with the groove section of the second filter section and the tongue section of the second filter section is overlappingly interengaged with the groove section of the first filter section when the first and second filter sections are in in-use positions in the filter holding frame.

2. An air filter assembly according to claim 1, wherein the filter holding frame is provided with at least two holding-down devices which resiliently engage over sides of the first filter section and exhibit a bulged profile.

3. An air filter assembly according to claim 1, wherein a side of the holding frame at a rear side of the second filter section in a feed-in direction of the second wherein a side of the holding frame at a rear narrow side of the filter section is equipped with a holding-down device resiliently engaging over said rear side, said holding device exhibiting a bulged profile in a direction toward the rear side of the second filter section and butt slopes for the rear side sliding therebelow.

4. An air filter assembly according to claim 2, wherein a side of the holding frame at a rear side of the second filter section in a feed-in direction of the second filter section is equipped with a holding-down device resiliently engaging over said rear side, said holding device exhibiting a bulged profile in a direction toward the rear narrow side of the second filter section and butt slopes for the rear side sliding therebelow.

5. An air filter assembly according to claim 1, wherein the holding frame is provided on a feed-in side of the filter sections with a hinged holding-down device which, when swiveled upwards, resiliently engages over an assigned side of the inserted second filter section and simultaneously locks onto an edge of the holding frame in a detachable fashion.

6. An air filter assembly according to claim 2, wherein the holding frame is provided on a feed-in side of the filter sections with a hinged holding-down device which, when swiveled upwards, resiliently engages over an assigned side of the inserted second filter section and simultaneously locks onto an edge of the holding frame in a detachable fashion.

7. An air filter assembly according to claim 4, wherein the holding frame is provided on a feed-in side of the filter sections with a hinged holding-down device which, when swiveled upwards, resiliently engages over an assigned side of the inserted second filter section and simultaneously locks onto an edge of the holding frame in a detachable fashion.

8. An air filter assembly according to claim 1, wherein the first and second filter sections are identical.

9. An air filter assembly according to claim 1, wherein the respective tongue and groove sections extend over substantially one half of the length of the respective lateral edges of the filter sections.

10. A method of inserting exchangeable first and second filter sections in an air filter assembly for a heating or air-conditioning system for the interior of a motor vehicle, comprising providing an air filter assembly comprising:

a filter holding-frame having a filter exchange opening and filter section guide devices for guiding insertion movement of filter sections into respective in-use positions in the holding frame, and first and second filter sections configured to be inserted into the holding frame with the first filter section inserted downwardly and longitudinally into the exchange opening and then laterally displaced to an in-use position followed by the second filter section being inserted longitudinally into the exchange opening with mutual overlapping inter-engagement of facing lateral edges of the first and second filter sections to thereby reliably hold the first and second filter sections together against relative lateral movement in respective in-use positions, wherein the first and second filter sections have identical lateral edges which are overlappingly interengaged when the filter sections are in in-use positions at the filter holding frame, wherein said identical lateral edges include a tongue section over a predetermined portion thereof and a groove section over a remaining portion thereof, each of said portions extending along only a part of the length of the respective lateral edges, and wherein the tongue section of the first filter section is overlappingly interengaged with the groove section of the second filter section and the tongue section of the second filter section is overlappingly interengaged with the groove section of the first filter section when the first and second filter sections are in in-use positions in the filter holding frame;

inserting the first filter section through the exchange opening with the groove section of the lateral edge of the first filter section at an insertion direction end of the first filter section and the groove section opening in a downward direction, laterally displacing a first filter section to an in-use position in the frame, and inserting the second filter section through the exchange opening with the tongue section of the lateral edge of the second filter section being slidably inserted into the groove section of the facing lateral edge of the first filter section.

* * * * *